United States Patent [19]
Kratsch et al.

[11] 3,891,134
[45] June 24, 1975

[54] FURNITURE PIECE FABRICATING MACHINE

[75] Inventors: Henry W. Kratsch, Oshkosh; Theodore W. Doehling, Larsen, both of Wis.

[73] Assignee: Medslist Industries, Inc., Milwaukee, Wis.

[22] Filed: Nov. 21, 1973

[21] Appl. No.: 417,874

[52] U.S. Cl. ............... 227/14; 227/27; 227/40; 227/69; 227/101
[51] Int. Cl. .................................. B27f 4/00
[58] Field of Search ............ 227/14, 21, 26, 27, 39, 227/40, 48, 50, 67, 69, 70, 71, 72, 73, 75, 76, 99, 100, 101, 151, 152

[56] References Cited
UNITED STATES PATENTS
| | | | |
|---|---|---|---|
| 1,137,854 | 5/1915 | Frantz | 227/14 |
| 2,617,095 | 11/1952 | Gondek | 227/99 X |
| 3,101,479 | 8/1963 | Bell et al | 227/76 X |
| 3,601,301 | 8/1971 | Backur | 227/14 |

*Primary Examiner*—Granville Y. Custer, Jr.
*Attorney, Agent, or Firm*—Joseph P. House, Jr.

[57] ABSTRACT

A furniture piece fabricating machine for successively working on a workpiece to cut it off, drill one or more dowel bores therein, inject glue in said bores and drive dowels into the glued bores. The workpiece is held adjacent a tool bed which can be tilted to vary the path of approach of the tools to the workpiece. The tilt mechanism and the spacial relation of the parts is such that the approach path of the tool to the workpiece will properly intersect the entry surface of the workpiece at any tilt angle of the bed.

12 Claims, 17 Drawing Figures

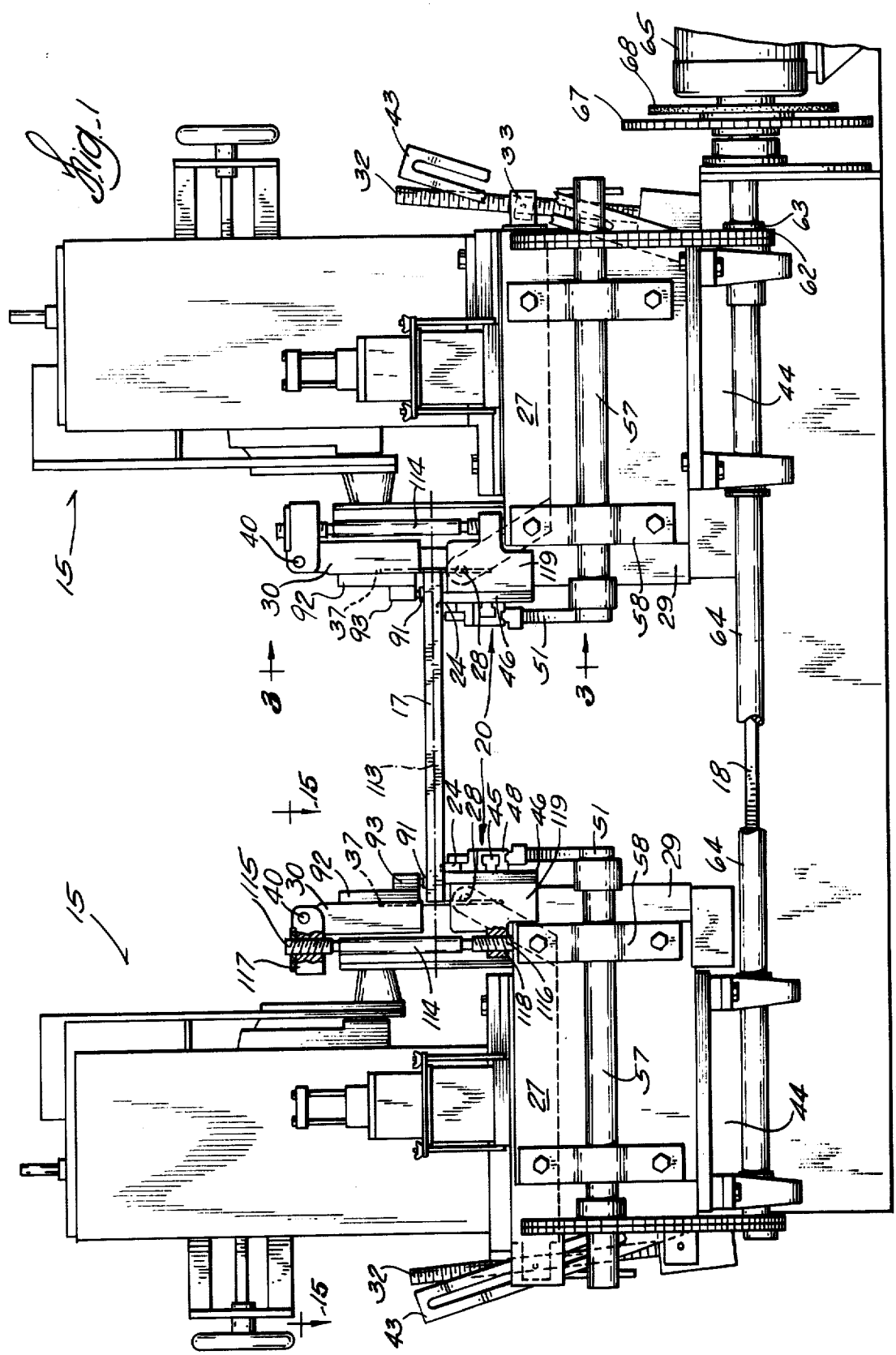

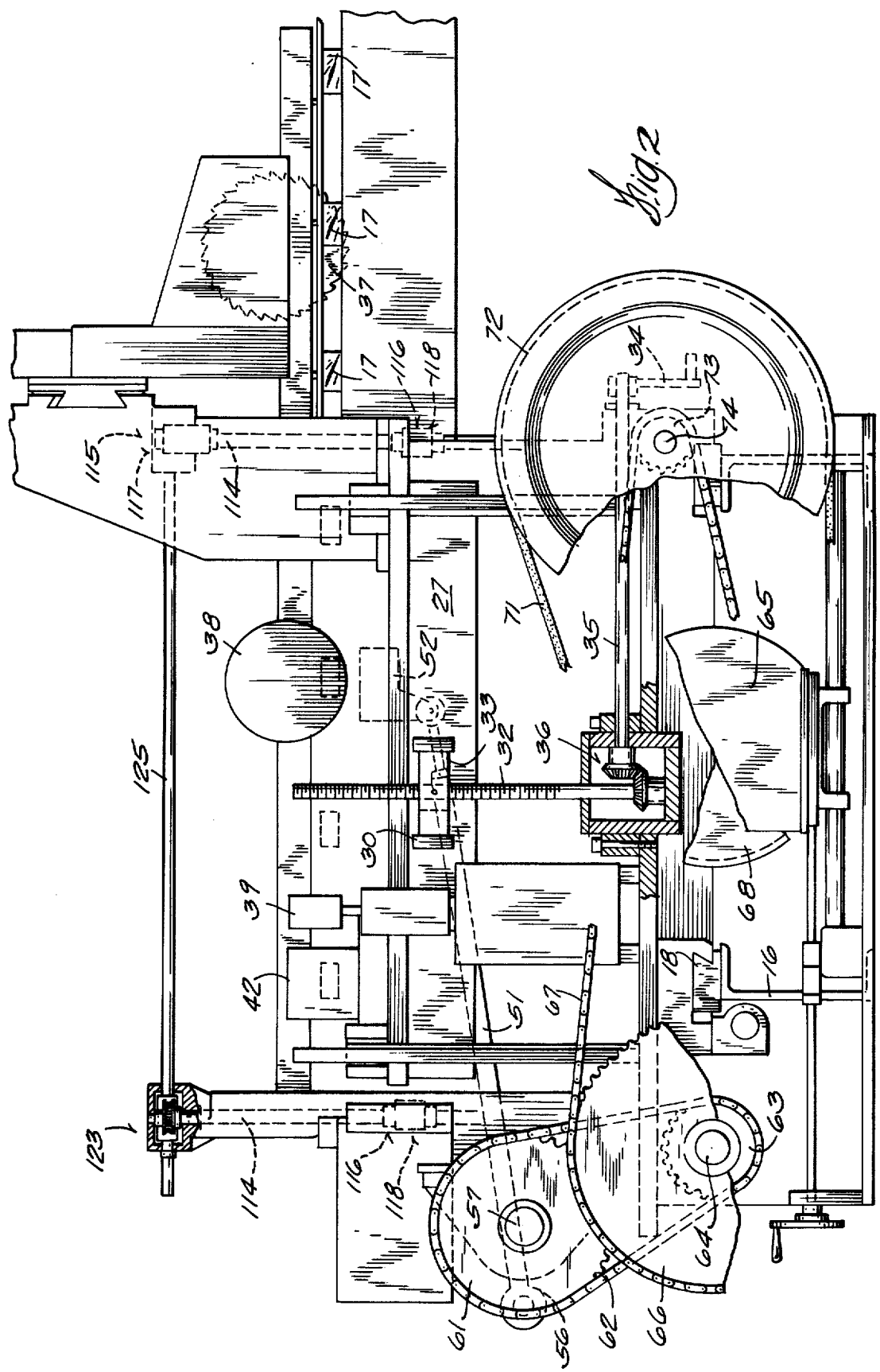

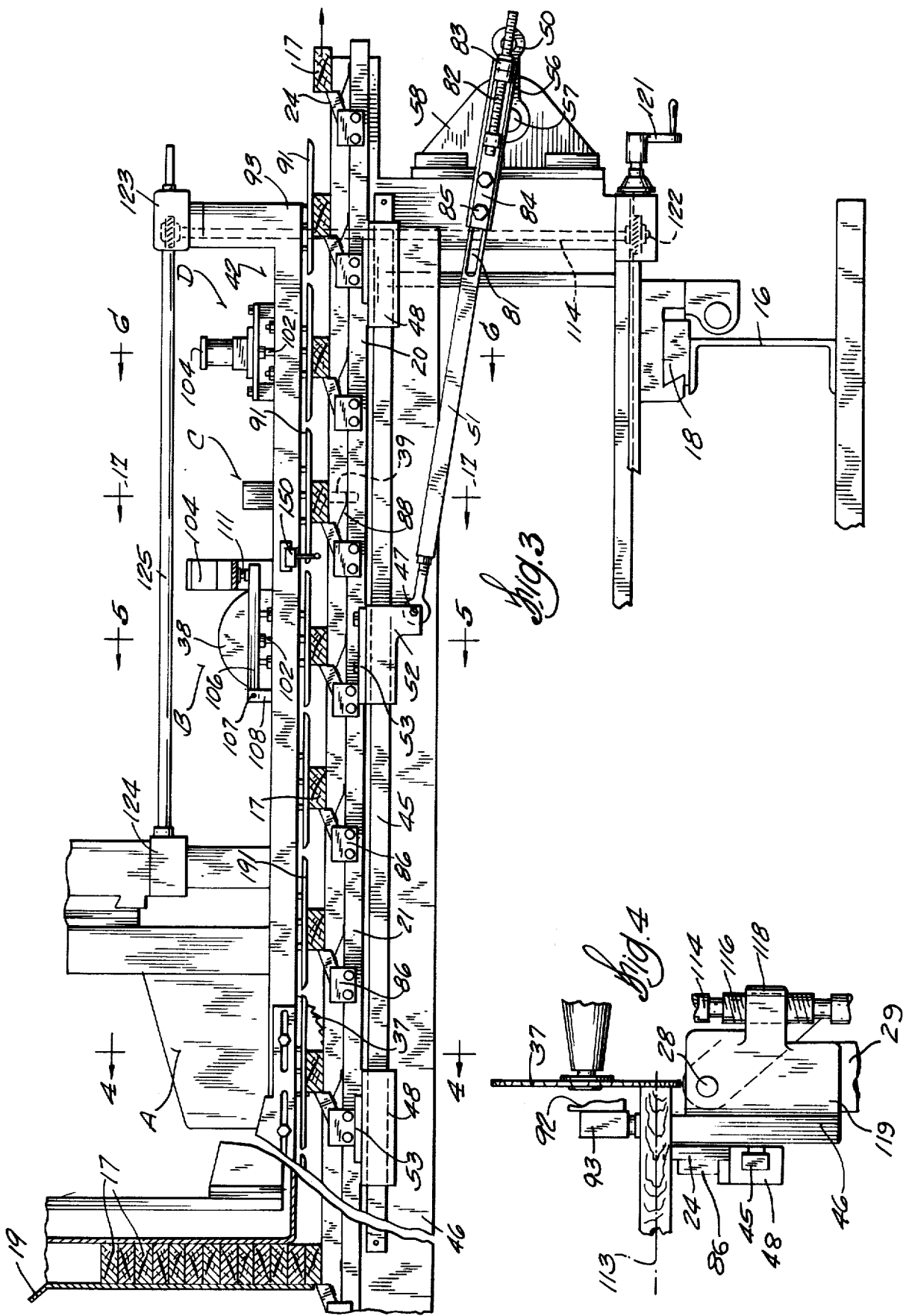

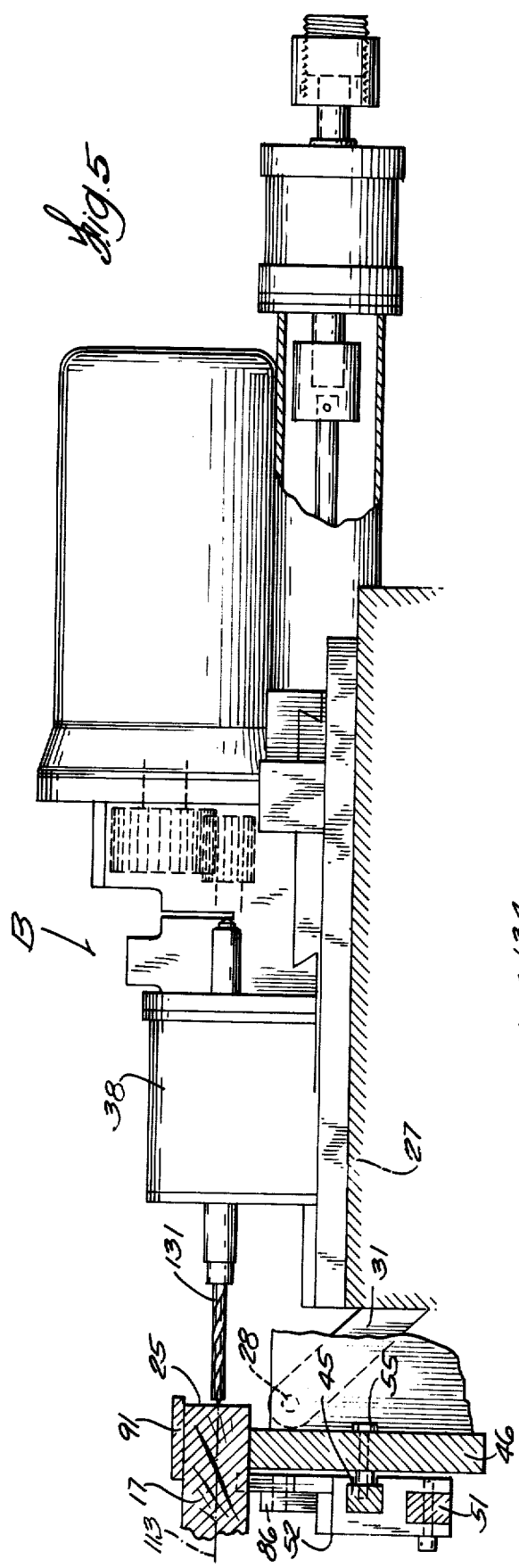
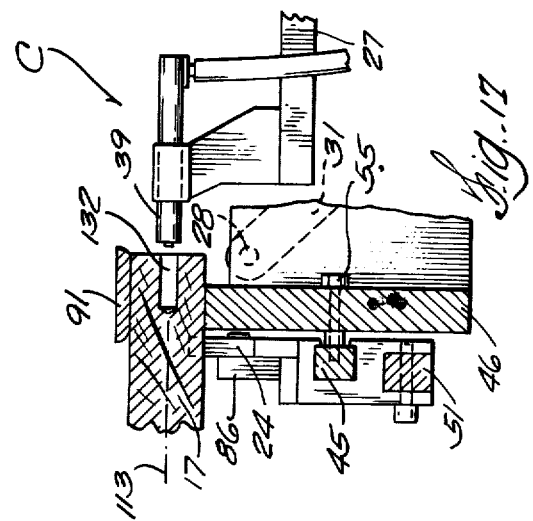
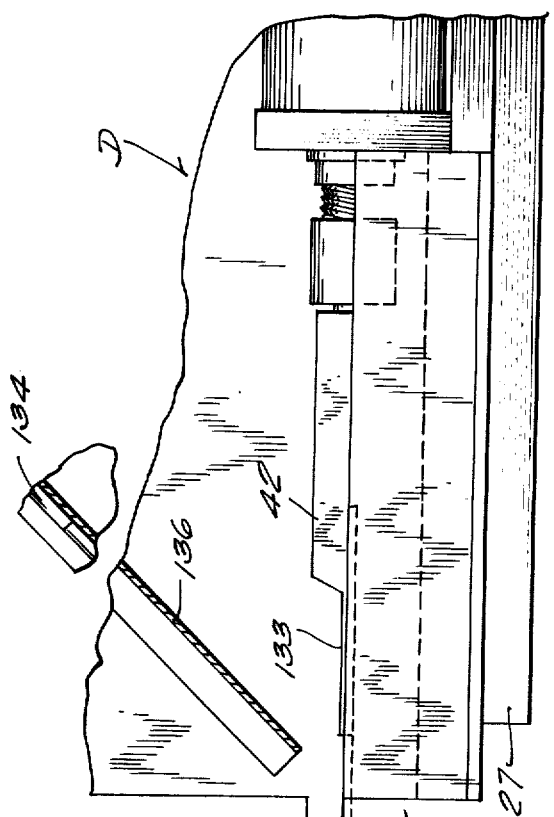

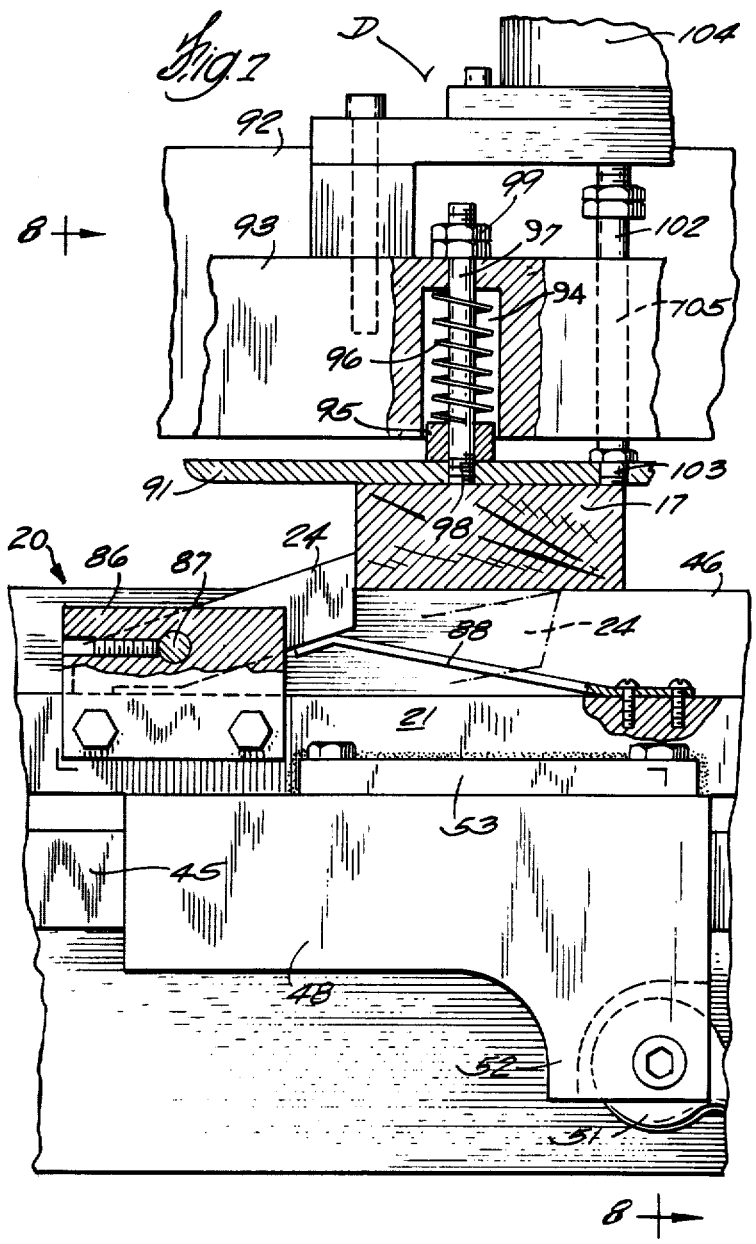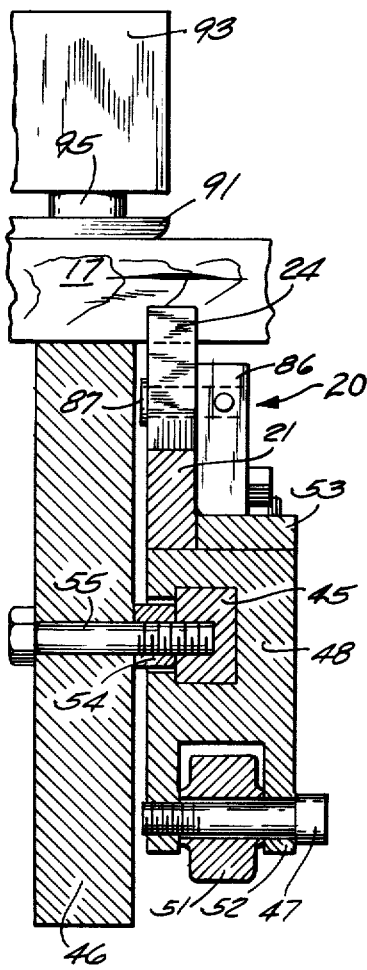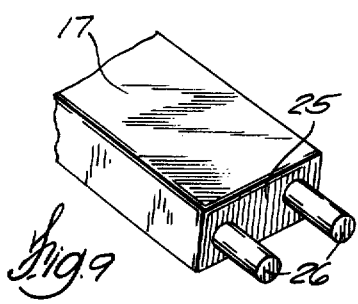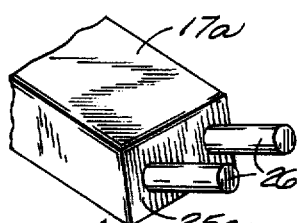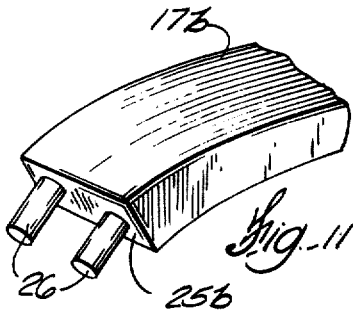

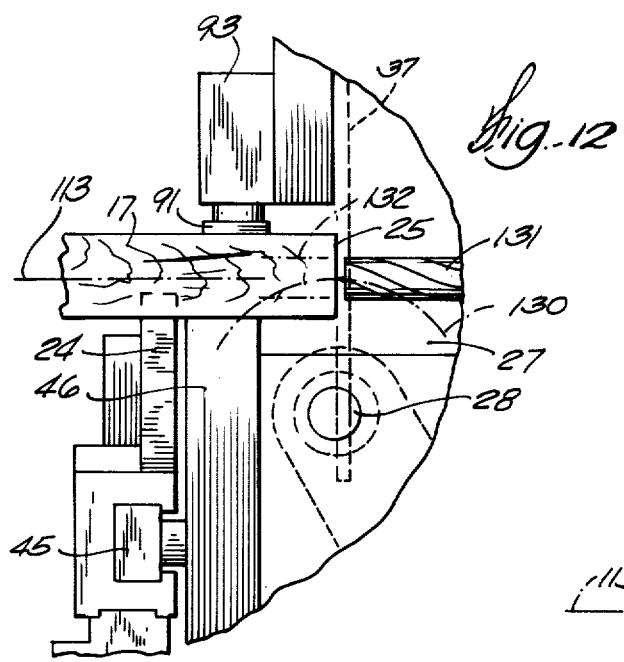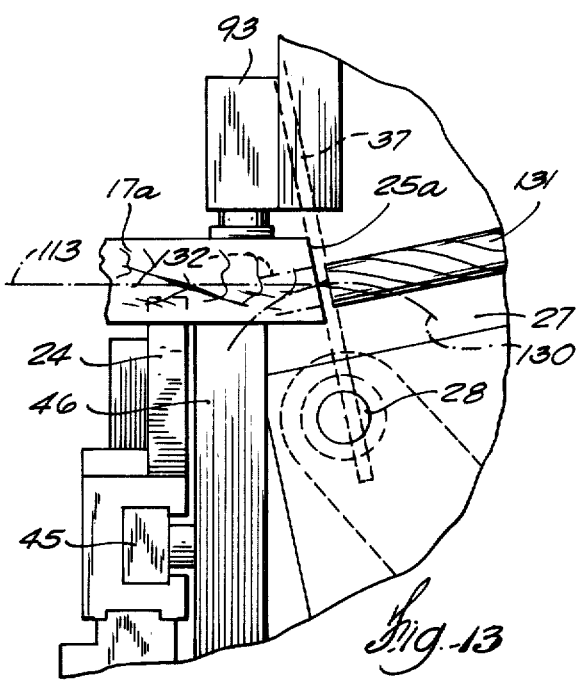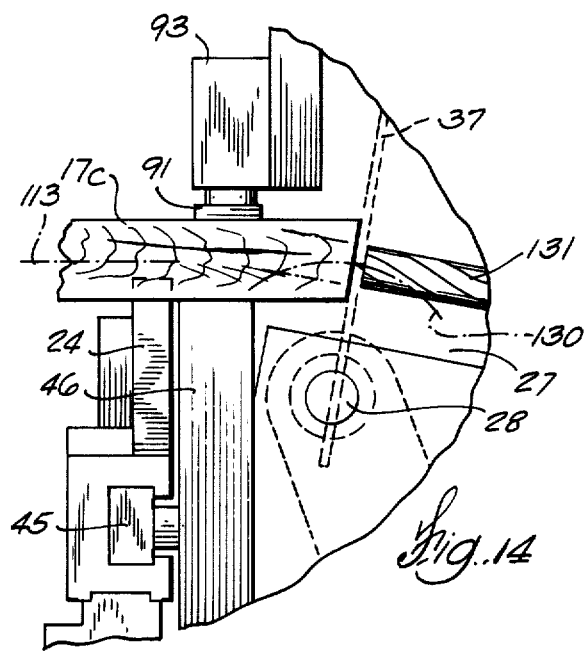

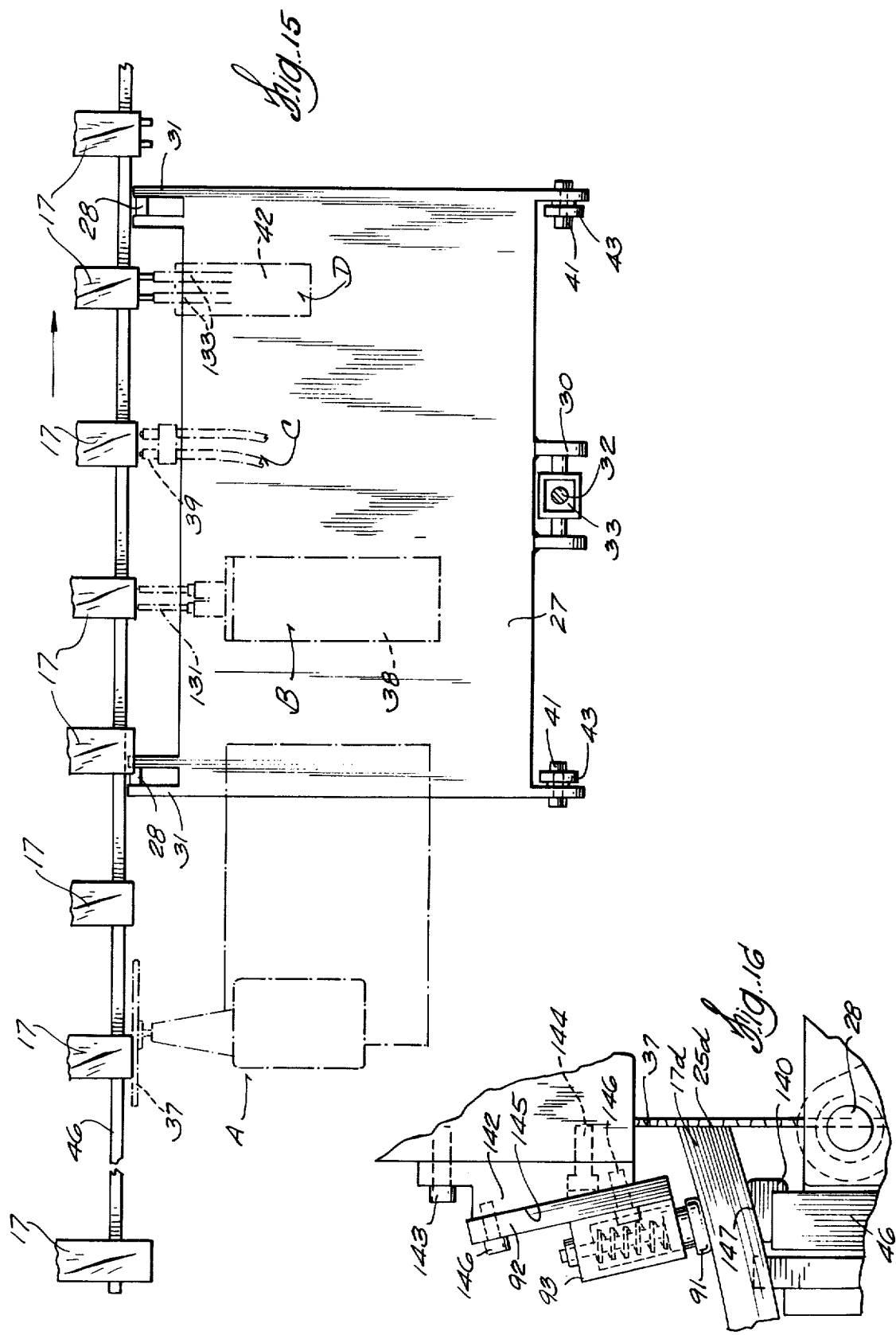

FURNITURE PIECE FABRICATING MACHINE

BACKGROUND OF THE INVENTION

U.S. Pat. No. 3,601,301 granted Aug. 24, 1971, shows a furniture piece fabricating machine which has been commercially successful. The device of said U.S. patent holds the workpiece at a single station and successive cutoff, drilling, glue injecting and dowel setting operations are successively performed at the single station. The tool bed of the machine is tiltable to drill and set the dowel at various angles to the workpiece, but it is necessary to make adjustments in either the position of the workpiece or the position of the tool after the bed has been tilted, in order for the tool to approach the workpiece on a proper part with respect to the entry surface of the workpiece.

SUMMARY OF THE INVENTION

In accordance with the present invention, the geometry or spacial relation of the tilt axis of the tilting bed for the tools, with respect to the workpiece and the path of approach of the tools to the entry surface of the workpiece, is such that the said approach path will properly intersect the entry surface of the workpiece at any tilt angle of the bed, without need for shifting the tool or the workpiece after the tilt bed has been adjusted.

This is achieved in the present invention by mounting the cutoff saw and the other tools which work on the piece on the same bed, to swing together. This automatically fixes the relationship between the tools so that all tools will have the same attitude or orientation with respect to the cut surface of the workpiece. Typically, the tools will have an approach path to the workpiece which should be at substantially a right angle to its cut or entry surface. By arranging the tools on the bed to have their approach path at substantially a right angle to the plane of the cutoff saw, the approach paths of the tools to the cut surface of the workpiece will be at the same angle.

It is also important that the approach path of the tools substantially intersect the cut surface of the workpiece on a predetermined axis, usually the centerline of the workpiece. For this purpose, and to accommodate for workpieces having different thicknesses, the workpiece holder has clamping jaws which are adjustable to and from both surfaces of the workpiece, thus to maintain a constant centerline for the workpiece, regardless of its thickness.

On the machine of the present invention, production rates are materially increased over those attained by the machine of U.S. Pat. No. 3,601,301 by providing separate stations for each successive operation, namely, cutoff, dowel bore drilling, glue injection and dowel setting. The workpiece is advanced from one station to the next by a shuttle stroke conveyor. Workpiece holding mechanism is provided to clamp the workpiece at each station, thus to hold it against dislocating forces imposed thereon by the successive tools, but to permit the workpiece to move from one station to the next.

For curved or oddly shaped workpieces, special auxiliary slide rails and tilting holddown blocks are provided to adapt such workpieces to fit the workpiece clamps.

Other objects, features and advantages of the invention will appear in the disclosure hereof.

DESCRIPTION OF THE DRAWINGS

FIG. 1 is an end elevation of double-ended apparatus embodying the present invention in which there are spaced corresponding machines in concurrently work on both ends of a single workpiece.

FIG. 2 is a side elevation taken from the right side of FIG. 1, parts being broken away and shown in cross section to expose details.

FIG. 3 is a fragmentary cross section taken along the line 3—3 of FIG. 1 and showing the successive workpieces in the course of their advance from one station to the next.

FIG. 4 is a fragmentary sectional view taken along the line 4—4 of FIG. 3.

FIG. 5 is a fragmentary cross section taken along the line 5—5 of FIG. 3.

FIG. 6 is a fragmentary cross section taken along the line 6—6 of FIG. 3.

FIG. 7 is an enlargement of a portion of FIG. 3, through the dowel setting station D.

FIG. 8 is an enlarged cross section taken along the line 8—8 of FIG. 7.

FIG. 9 is a fragmentary perspective view of one end of a workpiece with dowels set into an end surface at a right angle to the longitudinal centerline of the workpiece.

FIG. 10 is a view similar to FIG. 9, except that the end surface is at an oblique angle to the longitudinal centerline of the workpiece.

FIG. 11 is a view similar to FIG. 9, except that the workpiece is curved.

FIG. 12 is a fragmentary side view through the tilt axis of the tilt bed showing fabrication of the workpiece of FIG. 9.

FIG. 13 is a fragmentary side view through the tilt axis of the tilt bed showing fabrication of the workpiece of FIG. 10.

FIG. 14 is a fragmentary side view through the tilt axis of the tilt bed showing fabrication of a workpiece similar to FIG. 10, but in which the bed is turned down, instead of up.

FIG. 15 is a diagrammatic plan view of the tilt bed of one machine.

FIG. 16 is an enlarged fragmentary and elevation of a portion of one of the machines as shown in FIG. 1 and in which special auxiliary slide rails and tilted holddown shoe blocks are provided for holding and guiding curved workpieces.

FIG. 17 is a fragmentary cross section taken along line 17-17 of FIG. 3.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

As in the machine shown in U.S. patent 3,601,301, two substantially identical fabricating machines 15 are mounted on a base, including spaced parallel beams 16 upon which one or both of the machines 15 can be moved relative to each other on slideways 18 (FIG. 3) so as to vary the spacing between the machines 15, thus to adapt the machines to work simultaneously on opposite ends of a single workpiece, for example, a chair leg stretcher 17.

As best shown in FIG. 3, the workpieces 17 are desirably stored one on top of the other in a pair of vertical hoppers 19, one on each machine, in which the ends of the workpieces are guided. Intermediate portions of the workpieces span across the space which separates machines 15. The workpieces 17 are fed along the machines 15 by paired shuttle stroke type conveyors 20, disposed along the facing edges of the machines 15. The shuttle stroke conveyor 20 will be described in more detail later on in the specification, it being noted at this point merely that each conveyor 20 comprises a reciprocating bar 21 having a series of spring biased dogs or fingers 24 which engage opposite ends of the workpieces 17 and advance the workpieces from left to right in FIG. 3 during the processing thereof. The opposite ends of the workpieces 17 slide on slide rails 46.

The object of the machine is to provide the respective opposite ends of the workpieces 17 with one or more dowels 26, as shown, for example in FIG. 9. FIG. 9 illustrates end face 25 of workpiece 17 at a right angle to be longitudinal axis or centerline of the workpiece. FIG. 10 illustrates a workpiece 17a having an end face 25a which is at an oblique angle to the longitudinal axis or centerline of the workpiece. In this case the dowels 26 are set into end face 25a perpendicular to the end face 25a, and hence at an angle to the longitudinal axis of the workpiece. FIG. 11 illustrates another workpiece 17b which is curved. This workpiece has an end face 25b which is at a predetermined desired angle to the length of the workpiece 17b and also has dowels 26 which are at a right angle to the end face 25b.

The machine of the present invention is adapted to receive a workpiece 17, cut off the end face 25 at any desired angle, drill dowel bores 132 (FIG. 12) in said end face at a right angle to the plane of the end face, inject glue into said bores and to set or drive the dowels 26 into said dowel bores, regardless of the particular configuration of the workpiece or angle of its end face, as typified by the examples illustrated in FIGS. 9, 10 and 11.

Unlike the machine shown in U.S. Pat. No. 3,601,301, the machine of the present invention has multiple stations at each of which the successive steps in preparing the workpiece for receiving the dowel and setting the dowel are performed separately, the workpiece being advanced successively from one station to the next.

Tilt Bed

All of the tools on the machine which work on the end of the workpiece 17 are mounted on a common platform or bed 27 (FIGS. 5 and 15) which is pivotally mounted on axially spaced horizontal trunnion pins 28 from which platform 27 hangs from clevis hangers 31. Pins 28 are mounted on brackets 29 supported on bases 44. Each bed or platform 27 can be tilted about the axis of trunnion pins 28 by means of a jack screw 32 which engages nut 33 mounted by bracket 30 on the rear edge of the bed 27 (FIGS. 1, 2 and 15). Screw 32 is actuated manually from a hand crank 34 coupled through shaft 35 to a set of bevel gears 36 (FIG. 2) which turn the jack screw 32. By this mechanism bed 27 can be swung through an included angle of 30°, 15° about trunnion pins 28 above the horizontal or level position of bed 27 and 15° below the horizontal or level position of bed 27. This tilting adjustment of the bed is utilized to produced angled ends of the workpiece 17, such as shown in FIGS. 10 and 13 at 25a and in FIG. 14 at 25c.

When the bed 27 is positioned as desired by hand crank 34 and jack screw 32, it may be locked in position by tightening a lock nut 41 which engages the slotted prop 43 which is pivotally mounted at its lower end to the base 44 of the machine 15.

The various tools which work upon the end of the workpiece are mounted on the bed or platform 27 at successive stations, as follows. Station A, shown in FIGS. 3, 12 and 15, is for the circular cutoff saw 37. Station B, as shown in FIGS. 3, 5 and 15, is for the dowel bore drilling tool 38. Station C, as shown in FIGS. 3, 17 and 15, is for the glue injecting nozzles 39. Station D, as shown in FIGS. 3, 6 and 15, is for the dowel setting tool 42.

Accordingly, each tool 37, 38, 39, 42 will partake equally of the tilting movement of the bed 27. This is important in achieving one objective of the invention which is to avoid any need for adjustment for any of the tools with respect to the workpiece. For this purpose the respective tools 37, 38, 42 are so mounted on platform 27 so that the approach path of their working tool parts is at substantially a right angle to the cutting plane of cutoff saw 37. The cutoff saw 37 will cut the entry face 25 of the workpiece 17 at the predetermined desired angle to its longitudinal centerline 113, depending on the tilt angle of the bed 27. Thereafter each succeeding tool will be automatically properly oriented to the plane of the workpiece entry face 25.

Shuttle Stroke Conveyors

As previously indicated, each machine 15 has a shuttle stroke conveyor 20 mounted along an edge for the purpose of advancing the workpieces 17 from the hoppers 19 along guide rails 46 supported on brackets 29 and successively to stations A, B, C, and D. Each shuttle stroke conveyor comprises a square cross section guide bar 45 suitably mounted by bolts 55 and spacers 54 in outwardly spaced relation to its slide rail 46, as shown in FIG. 8. Above the guide bar 45 and slidable with respect thereto is the shuttle bar 21. As shown in FIG. 3, bar 21 is provided with T-slotted elongated collars 48, by which shuttle bar 21 is guided for reciprocating movement along the guide bar 45. Shuttle bar 21 is actuated to reciprocate back and forth along the guide bar 45 by a drive mechanism including a pitman 51 (FIG. 3) connected by bracket 52 and pintle 47 to one of the slide blocks 48. The respective slide blocks or collars 48 are connected by brackets 53 to the shuttle bar 21, as best shown in FIGS. 7 and 8.

The other end of pitman 51 is pivotally connected by pintle 50 to a crank arm 56 mounted on shaft 57 supported on brackets 58 from an end of machine 15. Shaft 57 is provided with an end sprocket 61 having a chain 62 about sprocket 63 on line shaft 64, as shown in FIGS. 1 and 2. Shaft 64 has one end coupled to a sprocket 66 driven from a chain 67 coupled to sprocket 73 on shaft 74 (FIG. 2) which carries a pulley 72 connected by belt 71 to pulley 68 on the shaft of drive motor 65.

Pitman 51 is adjustable in length by reason of a longitudinally extended slot 81 therein and the screw adjustor 82 with adjusting nuts 83 by which slide 84 connected to the pitman 51 through bolts 85 can be adjusted. Accordingly, the position of the shuttle stroke bar 21 with respect to other parts of the machine can be adjusted in the initial setup thereof, so as to synchronize the action of the tools on the workpiece 17.

The shuttle stroke bar 21 is provided with a series of dog blocks 86 (FIGS. 7 and 8) to which the respective workpieces engaging dogs or fingers 24 are pivotally mounted on pins 87. Each dog 24 is provided with a leaf spring 88 biasing the dog 24 to its full line position shown in FIG. 7 so that when said dogs are retracted behind the workpieces 17, the springs 88 will lift the dogs into projecting position to engage the rear edges of the workpieces. Accordingly, when the respective pitman 51 drive the shuttle stroke bars 21 of the conveyors 20 in the forward direction on both machines 15, a bottommost workpiece 17 will be stripped from under the stack thereof in spaced hoppers 19. The workpiece 17 will be advanced along the support provided therefor by the side rails 46.

Each machine 15 is also provided with a series of spring biased holddown shoes 91 supported in spaced relation above the track 46 from an overhead support rail 93 and beam 92. Rail 93 and beam 92 are supported on lead screws 114. The beams 92 have brackets 30 which are connected on pins 40 to the nuts 117 on the uppermost threads 115 of lead screws 114. As best shown in FIGS. 3, 7 and 8, rail 93 has vertical sockets 94 which are open at their lower ends to receive guide blocks 95 on top of shoes 91. Springs 96 are also disposed in said sockets 94 to bias the shoes 91 downwardly to the extent permitted by bolts 97 which are threaded at 98 at their lower ends to the shoes 91 and at their upper ends to nuts 99 which overhang the upper surface of the rail 93. Nuts 99 may be adjusted to establish the precise location of the shoes 91 with respect to the upper edge of the slide rail 46.

Accordingly, the workpieces 17 are frictionally clamped under the resilient bias of springs 96 between the shoes 91 and the slide rails 46 and will remain in any position to which they are advanced by the shuttle stroke conveyor 20. At the completion of its forward stroke, the shuttle stroke conveyor will advance respective workpieces 17 to tool stations A, B, C and D. When the shuttle stroke conveyor bar 21 moves rearwardly toward the left in FIG. 3, the spring biased dogs 24 will retract against the bias of their leaf springs 88 to the dotted line positions thereof shown in FIG. 7, as the dogs 24 are cammed beneath the workpieces 17 en route to the fully retracted position of the conveyor, in which the dogs 24 will be projected upwardly by their springs 88 to an elevated position to reengage the workpieces 17 and to strip the next workpiece 17 from beneath the stack in hoppers 19.

At certain stations, namely, stations B and D, it is desired to positively clamp the workpieces 17 in position, rather than rely entirely upon the bias of shoe springs 96 for this purpose. At stations B and D considerable thrust and twisting force of the tool against the workpiece is imposed, thus making it desirable to firmly clamp the workpiece against such dislocating forces.

FIGS. 3 and 7 illustrate the positive clamps at each station B and D. The shoes 91 at their stations are provided with thrust rods 102 having their lower ends 103 in threaded engagement with the shoes 91 and their upper ends connected to the piston of fluid motors 104. At station D the thrust rod connection to motor 104 is direct and at station B the connection is through lever 106. Thrust rod 102 passes through a suitable bore 105 in rail 93. Accordingly, at station D fluid motor 104 is actuated to press the shoe 91 firmly against the workpiece 17 and slide rail 46 at this station where the dowels 134 are driven into the bores 132 formed in the ends of the workpieces, as shown in FIG. 6.

At station B thrust rod 102 is mounted on a lever arm 106 which is pivotally connected on pin 107 to a bracket 108. The opposite free end of the lever 106 is connected to the piston rod 111 of fluid motor 104. By reason of the lever arm 106, mechanical advantage is provided in multiplying the force of the fluid motor 104 to exert enhanced clamping force of the shoe 91 against the workpiece 17 at station B.

It is an important feature of the present invention that the longitudinal horizontal axis or centerline 113 of the workpiece always remain in alignment with the point of intersection of the path of approach of the tool (for example, the axis of drill bit 131 in FIGS. 12, 13 and 14) and the plane of the cut face 25 of the workpiece, regardless of the thickness of a specific workpiece. For chair leg stretchers, workpiece 17 will typically range in thickness from ¾ inches to 2 inches. Accordingly, mechanism is provided for adjusting the interspacing between the jaw 91 and top edge of the slide rail 46 to accommodate for different thicknesses of workpieces, without changing the level of the centerline 113 thereof. For this purpose, on each machine 15, the upper rail 92 which carries shoes 91 and lower slide rail 46 are adjustably mounted for equal and opposite vertical movement upon pairs of turning lead screws 114. Lead screws 114 are arranged in two pairs, one pair for each machine. In each pair the respective lead screws 114 are near the ends of the machine and are threaded to complementary nuts connected to the respective rails 92, 46.

As best shown in FIG. 1, for example, lead screw 114 has its upper portion threaded at 115 with its thread lead in one direction and is threaded near its other end 116 with the thread lead in the opposite direction. These threads engage nuts 117, 118 which are coupled to the respective slide bars 92, 46 to concurrently move these slide rails toward one another or away from one another. The paired lead screws 114 are turned concurrently by manipulating hand crank 121 connected through worm and worm wheel gears at 122, 123, 124 and cross shaft 125 with the paired lead screws 114. Each machine 15 has a separate hand crank 121 for its adjustment. Nuts 118 are connected to rails 46 via brackets 119. As best shown in FIG. 2, the lead screws 114 are restrained from axial movement by their worm and worm wheel gearing (123 in FIG. 2). Accordingly, rotation of the lead screws 114 produced by actuation of hand crank 121 will cause concurrent movement of slide rails 92, 46 toward or away from one another.

The successive action of each tool at stations A, B, C and D on the workpiece is as follows. As shown in FIGS. 3, 4 and 15, as the workpiece 17 is advanced by the shuttle stroke conveyor 20 past the saw 37, the saw will cut the end of the workpiece to the desired length, as determined by the spacing between the two machines 15. Where the tilt bed 27 is horizontal, this cut-off produces an entry surface 25 at a right angle to axis 113, as shown in FIG. 9. Saw 37 remains fixed in its position on the bed 27 and the action of the shuttle conveyor 20 to push the workpiece 17 past the saw is relied upon for this cutting action.

At station B as shown in FIGS. 3, 5 and 15, one or more drill bits 131 on the drill 38 will advance to drill dowel bores 132 in the end of the workpiece 17. As hereinbefore indicated, the workpiece 17 is securely clamped by the positive clamping arm 106 during this operation.

At station C, as shown in FIGS. 3, 15 and 17, one or more glue injecting nozzles 39 will inject slugs of glue into the drilled bores 132.

At station D, as shown in FIGS. 3, 6 and 15, one or more dowel setting plungers 133 will push wooden dowels 134 across the guideways 135 and into the dowel bores 132. As described in U.S. Pat. No. 3,601,301, dowels 134 are supplied to the guideways 135 on a chute 136. Each of the operations at stations A, B, C and D occurs substantially concurrently on a separate workpiece 17. Accordingly, four workpieces 17 are undergoing different fabrication steps simultaneously, as distinguished from the much slower operation described in U.S. Pat. No. 3,601,301, where the respective operations take place one at a time on a single workpiece at a single station.

FIG. 12–14 illustrate how the apparatus of the present invention is adapted to work on ends of the workpiece at selectively different inclinations to the longitudinal axis or centerline 113 thereof without requiring lateral shifting of either the workpiece or the tools after the bed has been tilted. FIG. 12 illustrates a typical arrangement which is also shown in FIG. 9, where the entry or cut face 25 of the workpiece 17 is perpendicular to the centerline 113. Saw 37 cuts the surface 25 at station A. At station B the drill bit 131 enters the workpiece on the axis 113 and at a right angle to the entry surface 25.

It is significant that the trunnion pins 28 for the bed 27 provide a horizontal tilting axis for the bed 27 which is substantially coplanar with the entry surface 25 of the workpiece. The axis of trunnion pins 28 is offset laterally (vertically in the illustrated embodiment) from centerline 113 so that both the axis 113 and the path of tool approach to the workpiece (the axis of drill bit 131) are tangent to an arc 130 with its center on the axis of trunnion pins 28. This geometry assures intersection of the tool with the workpiece at the point of intersection of axis 113 with cut face 25, regardless of the specific tilt angle of the bed 27, provided only that the included tilt angle does not exceed 30°.

FIG. 13 illustrates the arrangement also illustrated in FIG. 10, where the entry or cut surface 25a has been cut at an angle to the centerline 113 of the workpiece 17a. In FIG. 13 the bed 27 has been tilted up 11°. Inasmuch as all of the tools on the bed 27 partake of its tilting motion, the original adjustment of the bed 27 to tilt it 11° about trunnion pins 28 tilts the saw 37, the drill bit 131, the glue nozzle 39 and the dowel pusher rods 133, all at this same 11° angle. Saw 37 will first cut the inclined entry face 25a. The plane of cut face 25a will automatically intersect the axis of trunnion pins 28, as shown in FIG. 13. Drill bits 131 will continue to intersect the entry plane 25a substantially at the point of intersection of centerline 113 with the entry plane 25a and both axis 113 and the axis of drill bits 131 remain tangent to arc 130. Accordingly, there is no need to shift either the workpiece or the drill bits, even though the bed 27 has been tilted. The drill bores 132 will be drilled at an oblique angle to axis 113 but will be normal to cut face 25a.

FIG. 14 illustrates another specific inclination of the bed 27 in which the bed is tilted downwardly about the axis of trunnion pins 28. Here again, the saw 37 will cut off the end of the workpiece 17c to produce an entry surface 25c at a right angle to the path of approach of drill bits thereto and the drill bits 131 will again enter the workpiece at the intersection of its centerline 113 with the entry face 25c. Axis 113 and drill bits 131 remain tangent to arc 130.

By locating the entry surface of the workpiece coplaner with the axis of bed tilting, there is an automatic adjustment of the parts as illustrated in FIGS. 12, 13, 14, whereby the tools will approach the entry surface 25c to intersect the entry surface on its centerline 113, regardless of the degree of tilt and the thickness of the workpiece. This is because the path of tool approach and the workpiece centerline will always be tangent to the arc 130 of swinging motion of the bed about the trunnion pins 28.

While in FIGS. 12, 13, and 14 only the drill bits 131 and saw 37 are illustrated, it is to be understood that the approach path of the dowel drive pins 133 at station D will have the identical approach path and geometry with respect to the entry surface of the workpiece and the centerline of the workpiece.

As shown in FIG. 16, special auxiliary slide rails and tilted holddown blocks are utilized for handling a curved workpiece, such as 17d. Standard slide rail 46 is provided with an elongated rail cap 140 which is releasably attached to the upper edge of slide rail 46 in any convenient manner.

Beam 92 and rail 93 with its spring biased shoes 91 are retained but are tilted to accommodate for the curved workpiece. Beam 92 is shimmed outwardly from machine frame 141 by a series of spacer blocks 142. Each spacer block 142 is connected to frame 141 by bolts 143, 144. Beam 92 is connected to the inclined face 145 of spacer block 142 by bolts 146. The angle of block face 145 to the vertical is such that the shoe 91 will have a full face engagement with the upper surface of the curved workpiece 17d. The angle of top surface 147 of the cap 140 will have a complementary angle for full face contact with the undersurface of the curved workpiece 17d.

Notwithstanding its curved configuration, workpiece 17d will be processed on the machine in the same manner as straight workpieces. Its end 25d will be cut off in a plane intersecting the trunnion pins 28 and the tilt bed 27 will have the same relation to workpiece 17d as to straight workpieces.

As shown in FIG. 3, bar 93 is provided with a feeler switch 150 in advance of station C. This switch is actuated by the passing workpiece 17. An electric circuit controlled by switch 150 will be triggered to condition the glue injecting apparatus 39 and dowel driving mechanism for operation. In the absence of a workpiece, switch 150 will not be actuated and the circuit will not be triggered. Hence no glue will be ejected from nozzles 39 and no dowels will be driven by driver 42 for the absent workpiece.

We claim:

1. In a furniture piece fabricating machine for setting a dowel in a workpiece to project substantially at a right angle from a cut surface thereof, said machine having a workpiece holder, a cutoff saw to cut said surface, a tool bed adjacent the workpiece and tilting mechanism by which the bed can be tilted to vary the path of approach of a tool on said bed to the workpiece, the improvement in said machine by which the approach path of the tool to the workpiece will intersect the cut face of the workpiece at substantially a right angle in any of a variety of tilt angles of said bed without requiring adjustment of the workpiece or tool after change in tilt angle, said improvement comprising both said cutoff saw and said tool being mounted on said bed to partake of tilt motion thereof, bed pivot means which defines a bed tilt axis disposed substantially in the plane of said saw whereby the said axis will also be disposed substantially in the plane of the cut surface of the workpiece, said tool having a path of approach to the workpiece substantially at a right angle to the plane of said saw whereby siad path will also be disposed substantially at a right angle to the cut surface of the workpiece.

2. The improvement of claim 1 in which the centerline of the workpiece and the path of approach of the tool to the workpiece are both tangent to the arc of swinging movement of said bed about said bed tilt axis.

3. The improvement of claim 1 in which the workpiece holder comprises clamp means adjustable for the thickness of the workpiece and having clamp jaws movable toward and away from both sides of the workpiece to maintain the workpiece centerline in substantially the same relation to the tilt bed axis regardless of the thickness of the workpiece and to maintain the point of intersection of the path of tool approach to the workpiece and the cut surface thereof substantially on said centerline regardless of the thickness of the workpiece.

4. The machine of claim 1 in which said tool bed has successive stations with tools at said stations which perform successive operations on the workpiece, the adjustment of said bed about its tilt axis being effective to tilt all tools concurrently, and means for advancing the workpiece from one station to the next.

5. The machine of claim 4 in which the tool at one station comprises a drill for drilling dowel bores in said cut surface, said workpiece holder comprising a positive clamp at said station.

6. The machine of claim 4 in which the tool at one station comprises a dowel driver for driving dowels into dowel bores in said cut surface, said workpiece holder comprising a positive clamp at said station.

7. The machine of claim 4 in which the means for advancing the workpiece from one station to the next comprises a shuttling conveyor having spring biased workpiece advancing dogs which retract when the conveyor retracts beneath the workpiece and which project when clear of the workpiece to engage the workpiece when the conveyor advances.

8. The machine of claim 4 in which the tools at said station comprise said end cutoff saw, a dowel bore drill, a glue injector and a dowel driver.

9. In double-ended apparatus in which a series of workpieces are advanced along a fabricating machine having tools for performing successive cutoff and doweling operations on the end of the workpiece, a slide rail along said machine and holddown shoe means above said slide rail, said slide rail and holddown shoe means comprising clamp jaws to guide and hold said workpiece adjacent said tools, said tools having predetermined paths of approach to said workpiece, and means for concurrently moving said jaws equally toward and away from the top and bottom sides of said workpiece whereby workpieces of different thicknesses can be accommodated therebetween without changing the orientation of the centerline of said workpiece with respect to said predetermined paths of approach of said tools.

10. The apparatus of claim 9 in which the means for concurrently moving said jaws comprises a lead screw having oppositely pitched screw portions, said jaws having nuts engaged with said screw whereby rotation of said screw will concurrently cause said jaws to move toward or away from each other.

11. The apparatus of claim 9 in which said workpiece has its longitudinal centerline on a horizontal axis, the opposed jaws being disposed in planes parallel to said axis.

12. The apparatus of claim 9 in which said workpiece is curved whereby its top and bottom surfaces are inclined at an angle to a horizontal plane, an auxiliary slide rail overlying said side rail and having an upper surface slanted to conform to the inclined undersurface of the workpiece, said holddown jaw having a mounting on which the jaw is slanted to conform to the incline of the upper surface of the curved workpiece.

* * * * *